United States Patent [19]

Moser et al.

[11] 4,169,745

[45] Oct. 2, 1979

[54] METHOD OF JOINING FROGS OF WEAR-RESISTING MANGANESE STEEL CASTINGS TO RAILS OF CARBON STEEL

[75] Inventors: Alfred Moser; Hubert J. Augustin, both of Leoben, Austria

[73] Assignee: Vereinigte Osterreichische Eisen- und Stahlwerke-Alpine Montan Aktiengesellschaft, Vienna, Austria

[21] Appl. No.: 932,214

[22] Filed: Aug. 9, 1978

[30] Foreign Application Priority Data

Aug. 19, 1977 [AT] Austria ................................ 6030/77

[51] Int. Cl.[2] ................................................ C21D 1/00

[52] U.S. Cl. ..................................... 148/127; 148/137

[58] Field of Search ....................... 148/136, 137, 127; 219/97, 99, 53, 55, 106; 238/164, 165

[56] References Cited

U.S. PATENT DOCUMENTS

| | | | |
|---|---|---|---|
| 1,704,410 | 3/1929 | Stedefeld | 148/127 |
| 1,757,972 | 5/1930 | Mead | 219/55 |
| 2,276,782 | 3/1942 | Jones | 238/164 |
| 3,022,968 | 2/1962 | McGrath | 148/137 |
| 3,865,639 | 2/1975 | Bellot et al. | 148/127 |

*Primary Examiner*—L. Dewayne Rutledge
*Assistant Examiner*—Peter K. Skiff
*Attorney, Agent, or Firm*—Cushman, Darby & Cushman

[57] ABSTRACT

A method of joining frogs consisting of wear-resisting austenitic manganese steel casting to rails of carbon steel by welding and with the aid of an interposed connector consisting of austenitic low-carbon steel, characterized in that the connector is first welded to the regular rail or interconnecting rail, particularly by flash-butt welding, that the length of the connector which has been welded to the regular rail is limited to 20 to 25 mm, at most, preferably to 15 to 20 mm, that in a second welding operation the frog consisting of a wear-resisting manganese steel casting is welded to the connector, preferably by flash-butt welding, and that the cooling after the second welding operation is effected at a higher rate than the cooling after the first welding operation.

6 Claims, 3 Drawing Figures 5 3 4
1 2
a

METHOD OF JOINING FROGS OF WEAR-RESISTING MANGANESE STEEL CASTINGS TO RAILS OF CARBON STEEL

This invention relates to a method of joining frogs of crossings or switches, which frogs consist of wear-resisting austenitic manganese steel castings, to rails of carbon steel by welding. Owing to their good wear-resisting properties manganese steel castings are highly suitable as frogs. On the other hand, it is very difficult to weld such frogs consisting of wear-resisting austenitic manganese steel castings to rails of carbon steel, particularly to the tread of the rails. These difficulties are mainly due to the fact that the wear-resisting austenitic manganese steel casting must be cooled quickly in order to avoid the formation of segregated carbides, which would embrittle the structure, whereas the rails consisting of carbon steel must be cooled slowly in order to avoid an increase in hardness. In view of these conflicting requirements it has already been proposed to provide connectors of tough austenitic low-carbon steel between the frog and the adjacent rails. In that known method these connectors may be cast integrally with the frog in a composite casting or may be separately made and joined by welding. In the latter case, the usual practice has been to weld the connectors to the frog of manganese steel and then to weld the rails to the connectors so that a transfer of heat to the welded joint made first is prevented during the second welding operation owing to the length of the connector. As a result, the frog consisting of a wear-resisting manganese steel casting which has been welded to the connector can be annealed and can subsequently be cooled quickly and can then be welded to the rail and the resulting welded joint may be cooled quickly because a temperature rise of the frog consisting of a wear-resisting manganese steel casting to elevated temeratures is prevented by the connector. These known methods require relatively long connectors. As the connector consists of a steel which is somewhat softer and less wear-resistant than the rail and the frog, the upper surface of the connector will be deformed in use in the course of time so that the riding comfort is highly adversely affected. Whereas the connector could be hard-surfaced with wear-resisting steel, this would require an additional operation. It is an object of the invention to avoid these disadvantages. The invention resides essentially in that a connector consisting of austenitic low-carbon steel is used and is first welded to the regular rail or interconnecting rail, particularly by flash-butt welding, the length of the connector which has been welded to the regular or standard-section rail is limited to 20 to 25 mm, preferably 15 to 20 mm, the frog consisting of a wear-resisting manganese steel casting is welded to the connector in a second welding operation, preferably by flash-butt welding, and cooling is effected after the second welding operation at a higher rate than after the first welding operation.

Because the connector is very short and the wheel diameter is relatively large, a formation of a depression in the upper surface of the connector is avoided. The wheel is about 1000 mm in diameter and such a short connector has a length of only ½% to at most 2% and, on the average, only about 1% of the wheel diameter. If a depression having the same radius of the wheel would form in the top surface of the connector, such a depression would have a depth of 0.1 mm at most, and would not adversely affect the riding comfort. After the first welding operation by which the connector has been joined to the rail, the cooling is effected at a higher rate than after the second welding operation, by which the connector has been welded to the frog. Because the cooling after the first welding operation will by no means influence the frog, such cooling may be effected at such a low rate that the rail steel will not increase in hardness. When the frog is being welded to the connector by the second operation, the first welded joint between the rail and connector is heated only to a temperature of about 700° C. even through the connector is short, and the cooling from that temperature need not be effected so slowly as a cooling from the welding temperature. It has been found that the frog need not be heated after the welding operation so that cooling can be effected immediately from the welding temperature and at such a high rate that the wear-resisting manganese steel casting is not yet embrittled or is embrittled so slowly that the carbon steel of the rail is not embrittled by a cooling from 700° C. It is apparent that it is essential to weld the connector to the rail first and to the frog in the second operation. Welding is preferably effected by flash-butt welding. This affords the advantage that heating is effected only over a short distance and that that portion of the material which is heated to fusion is squeezed out anyway and falls off.

In a preferred embodiment of the invention, the cooling after the second welding operation is effected as still air cooling and the cooling after the first welding operation is effected at a lower rate than would be obtained by still air cooling. It has been found that still air cooling is fast enough to avoid an embrittlement of the wear-resisting manganese steel casting when cooled from the welding temperature and is slow enough to avoid an increase of the hardness of the carbon steel of the rail during a cooling from a temperature 700° C.

The connector used in the method according to the invention has preferably the same sectional shape as the regular rails. For the flash-butt welding, the connector must be so long that it can be gripped in the welding machine. For this reason the method according to the invention can be carried out in such a manner that a longer connector is provided, which has preferably a length of about 50 mm, and is welded to the regular rail, and is subsequently cut to the required length. Alternatively, the method may be carried out in such a manner that a rail consisting of the material of the connector is welded to the regular rail and the remaining portion of that rail consisting of the material of the connector is subsequently cut off from the connector. Compared to a method in which larger connectors are prepared and are then cut to the required length, this affords the advantage that only one cut is required.

The invention is also based on the recognition that it is not only essential to provide for a thermal separation between the two welded joints in order to ensure the required cooling conditions. In a high degree, the embrittlement of the wear-resisting manganese steel casting which constitutes the frog is also due to the fact that the diffusion at the welded joint results in the formation of a mixed zone in which an unfavorable structure results. For this reason the connector should have such a length that a diffusion of alloying constituents between the rail and the wear-resisting manganese steel casting which constitutes the frog is avoided. This will also be ensured by a connector having the length stated hereinbefore.

During each welding operation, the connector must be expected to be reduced in length by about 10 mm by melting and upsetting. The statement that the length of the connector which has been welded to the regular rail is limited to 20 to 25, at most, preferably to 15 to 20 mm, applies to the connector which has been decreased in length by the first welding operation, by which the connector has been welded to the rail. For instance, the connector which is welded to the regular rail and has a length of e.g. 15 to 20 mm has previously been decreased in length by 10 mm by the first weldng operation. The second welding operation results in a further decrease of 10 mm in length so that the connector has subsequently a length of 5 to 10 mm. A length of about 5 to 10 mm will be quite sufficient to produce the desired result because a barrier layer of 0.1 to 1 mm will be entirely sufficient to prevent diffusion. But as there may also be a diffusion between alloying elements of the connector and the wear-resisting manganese steel casting, the selection of the material of the connector is also significant for the process according to the invention. For this reason, in a preferred embodiment of the invention, a connector is used which consists of an austenitic nickel-chromium steel having a nickel equivalent of 13 to 30 % and a chromium equivalent of 8 to 25 % in the Schaeffler diagram, the nickel equivalent being equal to 1×% nickel +30×% carbon +0.5 % manganese and the chromium equivalent being equal to 1×% chromium +1×% molybdenum +1.5×% silicon. When such material is selected for the connector, a diffusion between the material of the connector and the wear-resisting manganese steel casting which constitutes the frog will not be detrimental.

An embodiment of the invention is shown diagrammatically and by way of example in the drawing.

The frog 1 consists of a wear-resisting manganese steel casting. The regular rails 2 have been connected to said frog by flash-butt welding with the aid of interposed connectors 3.

Figure 1:
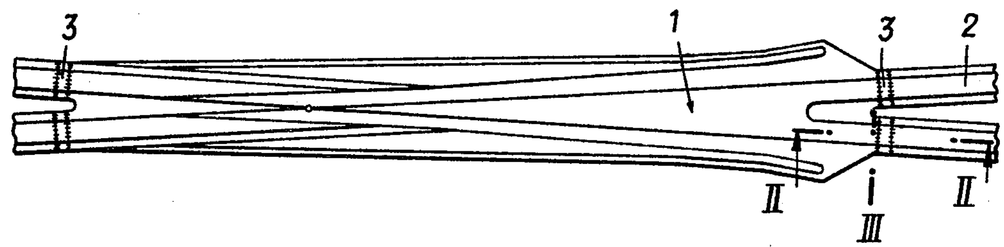
FIG. 1 shows a frog of a crossing and the regular or standard-section rails connected thereto.
Figure 2:
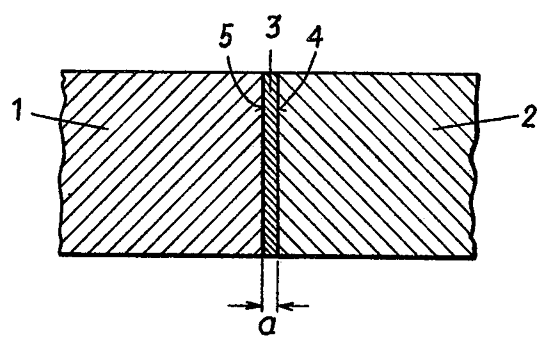
FIG. 2 is an enlarged view showing a sectional view taken on line II—II in FIG. 1.
Figure 3:
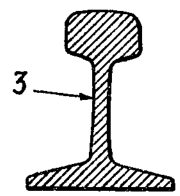
FIG. 3 is a sectional view taken on line III—III in FIG. 1.

Connectors in a length of about 50 mm are prepared. Connectors having that length can be gripped in a flash-butt welding machine. The connectors have the same sectional shape, shown in FIG. 3, as the regular rail. These connectors having a length of 50 mm are joined to the regular rails 2 in the usual manner by flash-butt welding to form the welded joint 4 shown in FIG. 2. The welded joint 4 is cooled slowly, e.g. under a heat-lagging protecting layer. The connectors are then cut to have a length of 15 mm from the welded joint 4 and are then joined to the frog 1 also by flash-butt welding. During the welding operation, the connector is again flashed off in a length of about 10 mm so that the connector then has a length a of 5 mm between the welded joint 4 and the welded joint 5 formed between the connector 3 and the frog 1 of manganese steel.

What we claim is:

1. A method of joining frogs consisting of wear-resisting austenitic manganese steel casting to rails of carbon steel by welding and with the aid of an interposed connector consisting of austenitic low-carbon steel, characterized in that the connector is first welded to the regular rail or interconnecting rail, particularly by flash-butt welding, and thereafter is cooled, that the length of the connector which has been welded to the regular rail is limited to 20 to 25 mm, at most, preferably to 15 to 20 mm, that in a second welding operation the frog consisting of a wear-resisting manganese steel casting is welded to the connector, preferably by flash-butt welding, and is thereafter cooled, and that the cooling after the second welding operation is effected at a higher rate than the cooling after the first welding operation.

2. A method according to claim 1, characterized in that the cooling after the second welding operation is effected by still air cooling and the cooling after the first welding operation is effected at a lower rate than would be obtained by still air cooling.

3. A method according to claim 1 or 2, characterized in that a connector is used which has the same sectional shape as the regular rail.

4. A method according to claim 1 or 2, characterized in that a connector having a larger length, e.g. of about 50 mm, is prepared and is welded to the regular rail and is then cut to the required length.

5. A method according to claim 1 or 2, characterized in that a rail consisting of the material of the connector is welded to the regular rail and the remaining portion of that rail consisting of the material of the connector is cut off from the connector.

6. A method according to claims 1 or 2, characterized in that a connector is used which consists of an austenitic nickel-chromium steel having a nickel equivalent of 13 to 30 % and a chromium equivalent of 8 to 25 in the Schaeffler diagram, the nickel equivalent being equal to 1×% nickel +30×% carbon +0.5×% manganese and the chromium equivalent being equal to 1×% chromium and 1×% molybdenum +1.5×% silicon.

* * * * *